United States Patent [19]
Miyanaka et al.

[11] Patent Number: 5,557,834
[45] Date of Patent: Sep. 24, 1996

[54] METHOD OF AND APPARATUS FOR ASSEMBLING COMPONENT PARTS

[75] Inventors: Hiroshi Miyanaka; Hideharu Sakimori; Yuzo Uotani, all of Hiroshima-ken, Japan

[73] Assignee: Mazda Motor Corporation, Hiroshima-ken, Japan

[21] Appl. No.: 360,932

[22] Filed: Dec. 21, 1994

[30] Foreign Application Priority Data

Dec. 27, 1993 [JP] Japan .................................. 5-350281

[51] Int. Cl.⁶ .............................. B23P 13/00; B23P 21/00
[52] U.S. Cl. ........................... 29/407.05; 29/430; 29/711; 29/791; 29/888.06
[58] Field of Search ............................ 29/407.05, 407.1, 29/430, 711, 791, 793, 888.01, 888.06; 198/347.1, 465.2

[56] References Cited

U.S. PATENT DOCUMENTS 5,271,139 12/1993 Sticht .......................................... 29/430
5,353,495 10/1994 Terabayashi et al. ................. 29/793 X

FOREIGN PATENT DOCUMENTS 63-156009 10/1988 Japan .

Primary Examiner—S. Thomas Hughes
Attorney, Agent, or Firm—Keck, Mahin & Cate

[57] ABSTRACT

In a method of and an apparatus for assembling units, incomplete units are moved forward along an assembly line, in progression, to successive stations for the addition of components to the unit until the unit is complete. Each unit, with machined parts, is disassembled at a disassembling station, provided with components including a specific part, and provisionally assembled as a whole at an assembling station. After the provisionally assembled units have been inspected as to a positional relationship of the components relative to one another, they are incorporated into a row of incomplete units so that one provisionally assembled unit is located after every incomplete unit and are disassembled at the disassembling station and, thereafter, reassembled again. During the second assemblage, the specific part is replaced with another specific part according to a result of the inspection so as to provide a predetermined positional relationship among the components, thereby completing the unit.

11 Claims, 3 Drawing Sheets

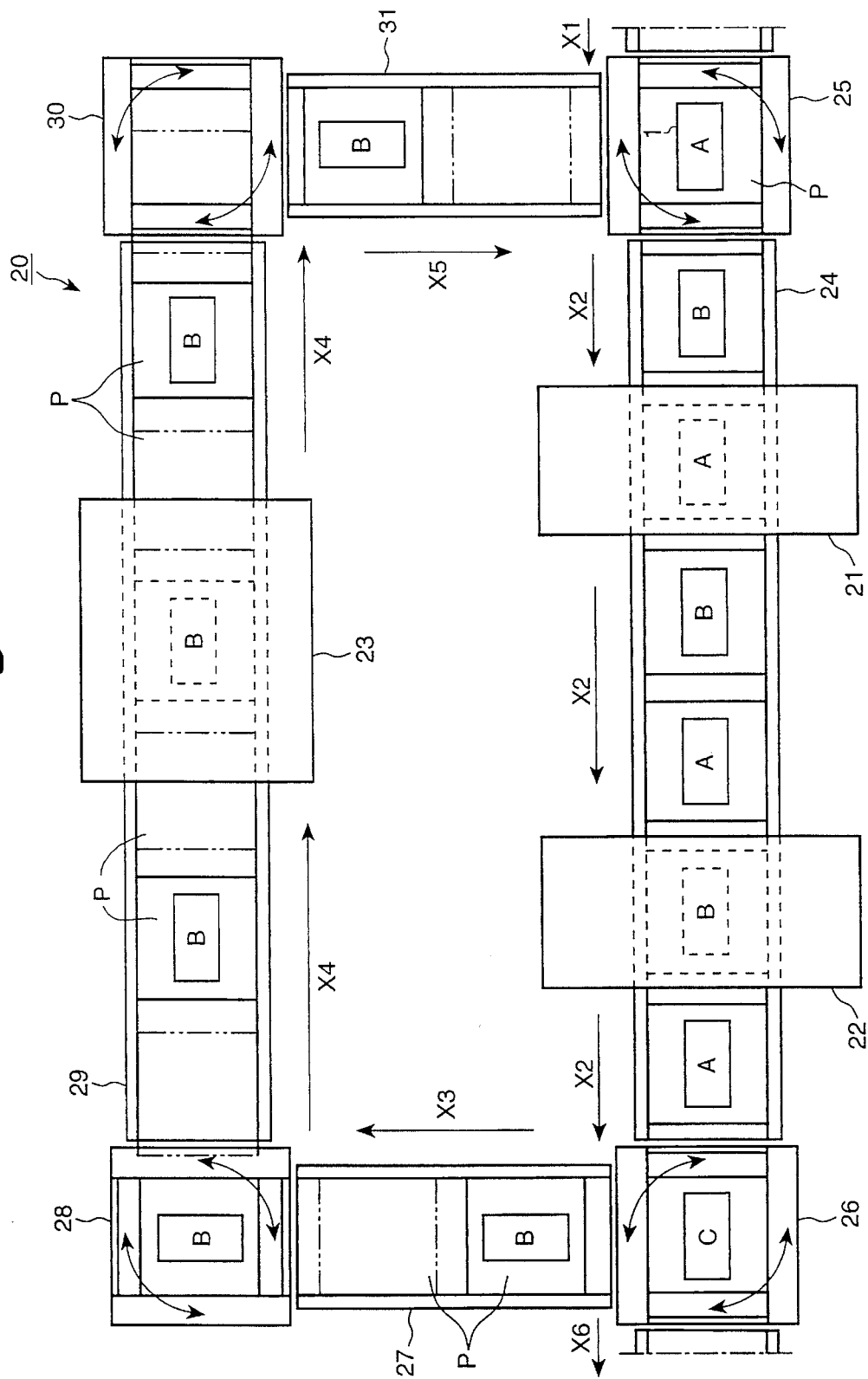

5,557,834

METHOD OF AND APPARATUS FOR ASSEMBLING COMPONENT PARTS

BACKGROUND OF THE INVENTION

1. Field of the Invention

The present invention relates to a method of and an apparatus for assembling units in an assembly line in which component parts, including a tentative component part, are provisionally assembled into a unit, in which, after an inspection as to a positional relationship among the components, the unit is disassembled for replacement of the tentative component part with another as a permanent component part, which is suitable to provide a predetermined positional relationship among the component parts, and in which the disassembled unit is assembled again as a complete unit.

2. Description of Related Art

In the course of recent technological advancement, it has proved to be necessary to increase, as far as possible, the precision of assembling component parts into units such as industrial products, for instance automobiles, industrial machines, etc., in so-called automated assembly lines to achieve a high accuracy and a uniform quality, so that the complete products exhibit a high performance.

For instance, engine cylinder heads have various component parts installed around cylinders such as, for instance, intake and exhaust valves, a camshaft, etc., which have repercussions of great importance on good engine performance such as, in particular, speed and fuel efficiency of an engine. It is known that a relative position between a valve and a cam is of particularly great importance in terms of the sealing performance of the valve, the impact of the closing valve and the lift of the valve. Consequently, it is necessary to inspect the relative position of the valve relative to the cam after having assembled them to the cylinder head and, if necessary, disassemble the cylinder head for the replacement of one specific component part with another so as to provide a desired relative position.

For the purpose of enhancing an understanding of the work of reassembling, reference is made to FIG. 1.

FIG. 1 shows part of a cylinder head 1 of an overhead camshaft engine for an automobile. After having installed a valve 2 and a tappet 3 to the cylinder head 1, an overhead camshaft 6 is placed between a semi-circular metal bearing 5, formed integrally on the cylinder head 1, and a semi-circular metal bearing 8, formed as a bearing cap 7 and held stationary therebetween by fastening nuts 10 onto bolts 9. If the overhead camshaft 6 has been assembled to the cylinder head 1 with its cam 11 placed too closely to the tappet 3, then the valve head of the valve 2 tends to be seated loosely on a valve seat 12. On the other hand, if the overhead camshaft 6 has been assembled to the cylinder head 1 with its cam 11 placed improperly far from the tappet 3, the valve head of the valve 2 tends to cause an impact against the valve seat 12 during closing due to a steep angle at which the cam 11 is brought into contact with the tappet 3, resulting in a shortened useful life of the cam 11. In order for the camshaft 6 to provide an appropriate valve clearance between the cam 11 and tappet 3, it is necessary to inspect or examine whether or not the valve clearance is proper after the camshaft 6 has been assembled to the cylinder head 1 and, if the valve clearance is improper, replace some parts for valve clearance adjustment. This parts replacement demands disassembly and re-assembly of the cylinder head 1. In order for the adjustment of valve clearance to be executed easily, it has typically been known to place a shim 4 in a top recess 3' of the tappet 3. One shim 4, which is a thin disk, is replaced with another having a thickness suitable to provide a desired valve clearance.

Much attention has been given to various approaches relating to valve clearance inspection techniques. One such approach is that described in, for instance, Japanese Unexamined Utility Model Publication No. 63-156009.

If the semi-circular metal bearings 5 and 8, fitted to each other, do not form a true round bearing bore, it is difficult to insure alignment of the camshaft 6 with the bearings 5 and 8, and consequently maintain a desired valve clearance. In order to eliminate any irregular alignment, it is necessary to perform boring between the cylinder head 1 and the bearing cap 7 previously secured to the cylinder head 1. In the course of installing or assembling component parts of a valve mechanism such as, for instance, the valve 2, the tappet 3 and a standard shim disk 4 to the cylinder head 1 with a camshaft bearing bore formed in that manner, the parts can be assembled only after the removal of the bearing cap 7 from the cylinder head 1. Thereafter, the camshaft 6 is assembled and held for rotation by the metal bearings 5 and 8. After an inspection of valve clearance, if the standard shim disk 4 is improper in thickness, it must be replaced with another shim disk suitable to provide a desired valve clearance. It is necessary, for this shim disk replacement, to perform disassemblage and reassemblage of the cylinder head 1 once again. Accordingly, disassembling and reassembling the bearing cap 7 and the camshaft 1 has to be repeated two times, once before and another after the inspection of valve clearance, until the cylinder head 1 is complete.

Installation of disassembling and assembling stations in series, both before and after the inspection station, makes a production line too long, leading not only to inefficient use of space in a factory but also to a large investment in installation of control units and drive systems for the respective work stations in order to rule over the production line, including the work stations, altogether. This results in an increase in production costs.

If there are provided transportation conveyers between adjacent work stations of a series arrangement of a plurality of different work stations and these work stations take different working cycles, then there unavoidably occurs an accumulation of units to be in front of before any work station which takes a working time longer than the preceding work stations. In other words, the units must be left to wait for a long time at the preceding station, causing a reduction in productivity of the production line.

SUMMARY OF THE INVENTION

It is an object of the present invention to provide a method of and an apparatus for assembly of component parts which enables building a production line with the least number of necessary facilities so as to shorten the entire length of the line.

It is another object of the present invention to provide a method of and an apparatus for assembly of components parts which is suitable for a rationalization of production and space and cost saving.

The above-described problems associated with prior art assembly lines, such as automobile assembly lines, are solved by the present invention. Specifically, according to the present invention, an assembly line transports incomplete units forward, one after another, toward successive work stations, such as a disassembling station, an assembling station, and an inspection station, in progression for the addition of component parts to the unit until the unit is complete. After having disassembled each incomplete unit, with a component part having been previously machined as an integral part thereof, at the disassembling station, various component parts, including a provisional component part, are added and assembled to the incomplete unit so as to provide a provisionally completed unit (which will be hereafter referred to as a provisional unit) at the assembling station. The provisional unit is subsequently inspected as to a positional relationship of the component parts relative to one another. The assembling line circulates and incorporates the provisional units into a row of incomplete units so that one provisional unit is located after every incomplete unit. Each provisional unit is disassembled at the disassembling station for replacement of the provisional component part with another as a permanent component part, which is suitable to provide a predetermined positional relationship among the component parts, according to a result of the inspection. The disassembled unit is assembled again as an enduringly complete unit (which will be hereafter referred to as an enduring unit) at the assembling station.

The assembly line comprises a main assembly line, along which at least the disassembling station and the assembling station are arranged, in order, and a circulation line connected to the main assembly line so as to form a closed loop. The circulation line circulates and incorporates provisional units into a row of incomplete units on the main line, one after every incomplete unit, so as to subject each provisional unit to disassemblage and reassemblage once again at the same stations, respectively, for the replacement of the provisional component part with a suitable component part. In order for the assembly line to incorporate provisional units into a row of incomplete units on the main line, one after every incomplete unit, a turn table type of transitional conveyer is located at a juncture for performing alternate entry of incomplete units and provisional units into the main assembly line.

The inspection station may be located either along the main assembly line or along the circulation line.

According to a preferred embodiment of the present invention, the assembly line puts both the disassembling station and the assembling station to an optimum utilization twice, i.e. a first time for provisional assemblage and a second time for enduring assemblage, so as to enable a production line to be built with the least number of necessary facilities and realize a rationalization of production and space and cost saving.

Specifically, when the inspection station is installed along the circulation line, accumulation of provisional units before the inspection station does not occur even if a longer working time than in the preceding work stations is required. This provides an improvement in production efficiency.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals are used to denote the same or similar parts or elements throughout the drawings and in which:

FIG. 3 is a schematic illustration of an assembly line according to another preferred embodiment of the present invention.

DESCRIPTION OF THE PREFERRED EMBODIMENTS

Figure 1:
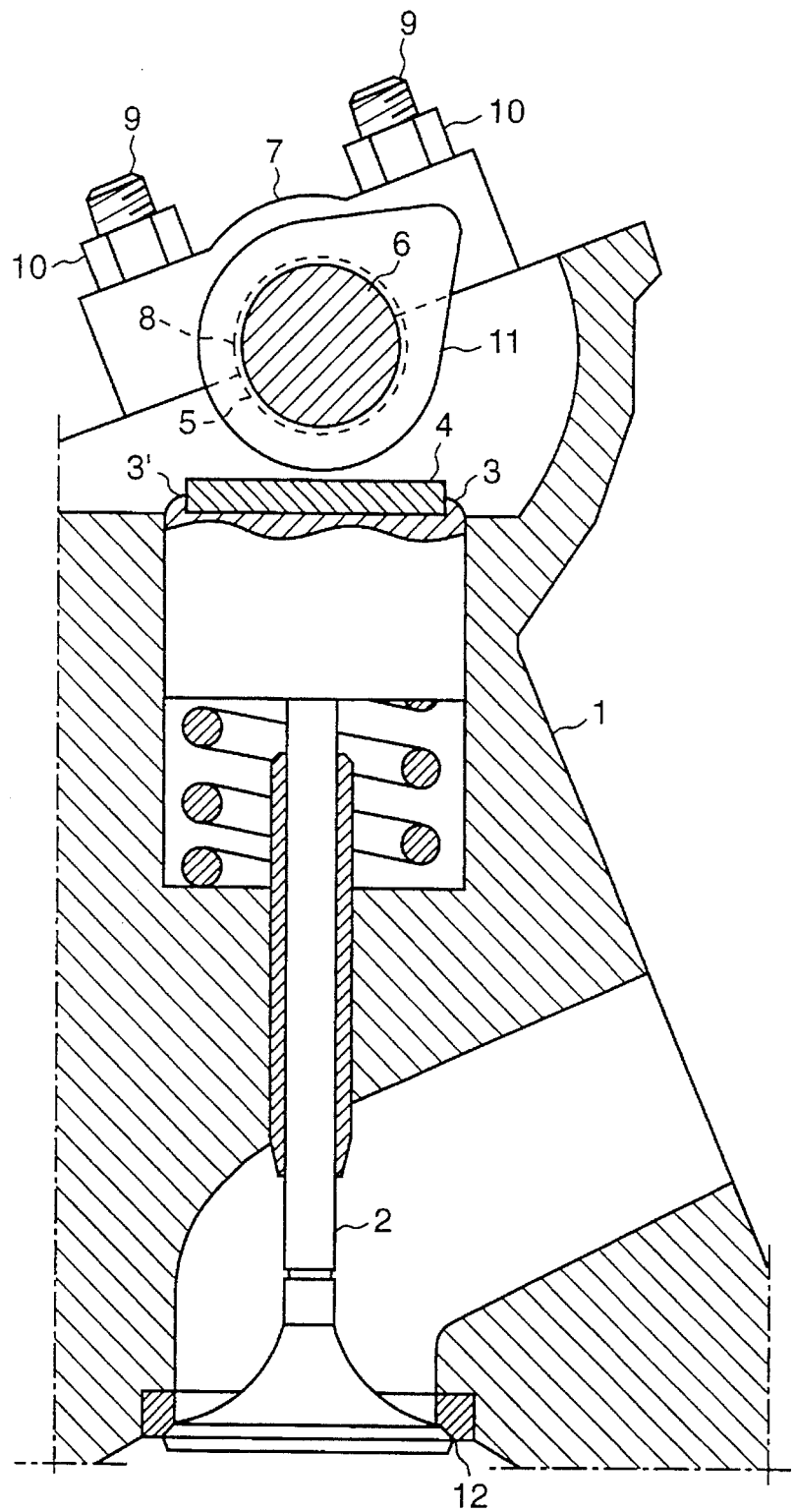
FIG. 1 is a cylinder head to be assembled by a method according to the present invention.

Referring now to the drawings in detail, and in particular, to FIG. 1, which shows a cylinder head 1 as a unit to be assembled in an assembling method in accordance with a preferred embodiment of the present invention, the cylinder head 1 with a bearing cap 7 secured thereto by fastening nuts 10 onto bolts 9 is delivered to an assembly line, which will be described later in conjunction with FIG. 2. At a boring station located before the assembly line, boring is performed so as to finish and form a substantially true round bearing surface between the top wall of the cylinder head 1 and the bearing cap 7. Specifically, an upper half of the bearing surface is formed as a semi-circular bearing surface 8 in the bearing cap 7. Similarly, a lower half of the bearing surface is formed as a semi-circular bearing surface 5 on the top wall of the cylinder head 1. This finish boring is made in order to eliminate any irregularity in alignment of a camshaft 6 with respect to the bearing surfaces 5 and 6.

When the cylinder head 1, with the bearing cap 7 secured thereto, is delivered to the assembly line, after having removed or disassembled the bearing cap 7, a valve 2 and a tappet 3, which form a part of a valve lift mechanism, are preliminarily assembled to the cylinder head 1 in a well known manner. Thereafter, a standard shim disk 4 is placed in a top recess 3' of the tappet 3 and a camshaft 6 is placed on the lower half semi-circular bearing surface 5 on the top wall of the cylinder head 1. Subsequently, a bearing cap 7 is secured once again to the cylinder head 1 by fastening nuts 10 onto bolts 9 so as to support the camshaft 6 for rotation between the cylinder head 1 and the bearing cap 7.

An inspection is made so as to find whether or not a desired valve clearance is provided between the camshaft 6 and the tappet 3. More specifically, the inspection is made to try to detect a clearance between a cam of the camshaft 6 and the standard shim disk 3' on the tappet 3. If the standard shim disk 4 is too thick or too thin to provide the proper valve clearance, it is replaced with any one of a number of other shim disks, different in thickness, which is the most suitable for the proper valve clearance. For the replacement of the standard shim disk 4, the cylinder head 1 is disassembled in the reverse way and reassembled in the same way after the replacement.

Figure 2:
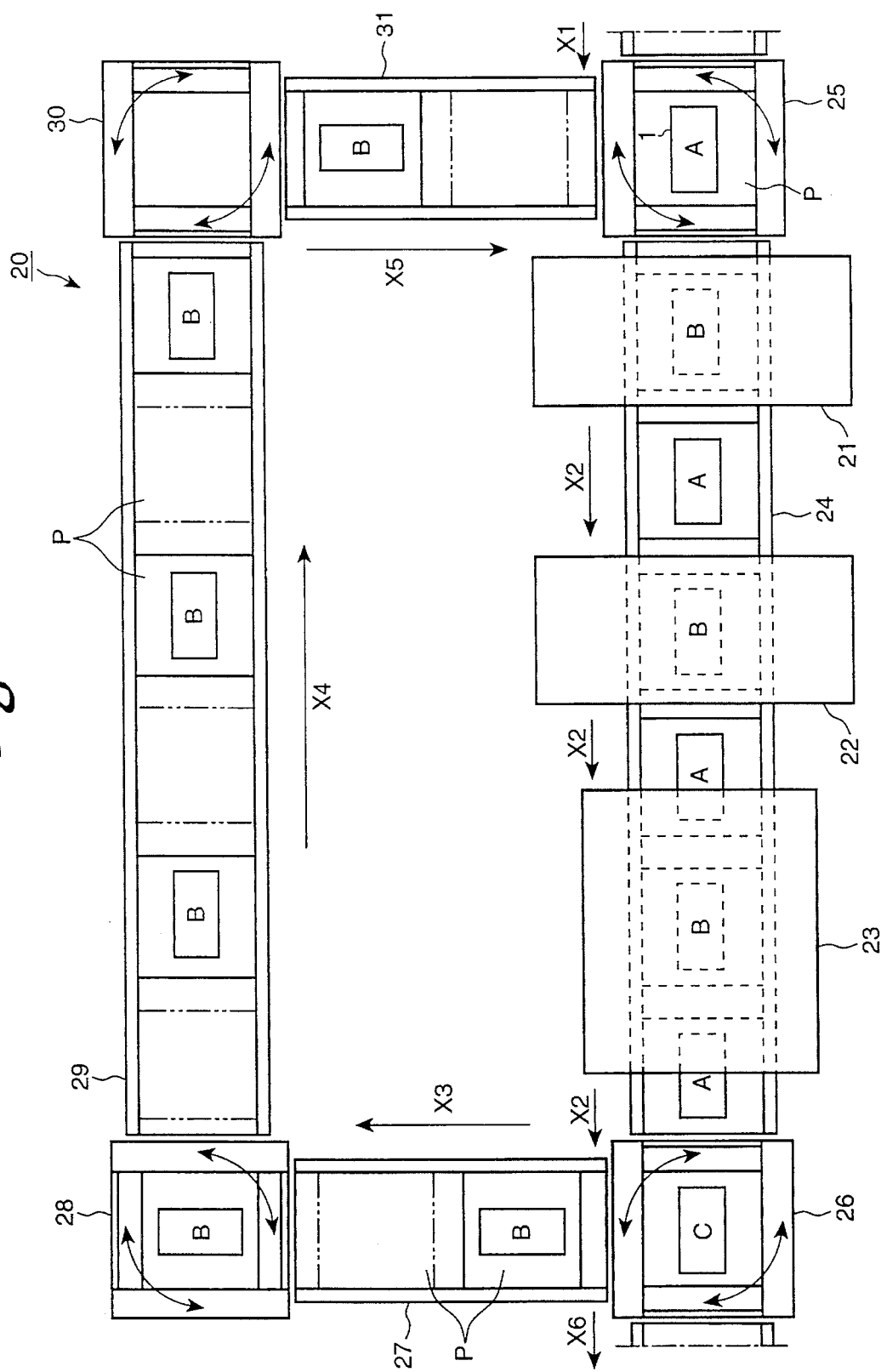
FIG. 2 is a schematic illustration of an assembly line according to a preferred embodiment of the present invention.

Referring to FIG. 2, in the assembly line 20, which has first to fourth straight transportation conveyers 24, 27, 29 and 31 arranged in a rectangular formation, there is a straight row of work stations such as, for instance, a cap removal or disassembly station 21, an assembly station 22 and an inspection station 23 along the transportation conveyer 24. At the disassembly station 21 there is provided a nut runner (not shown) for unfastening the nuts 10 so as to remove the bearing cap 7. At the assembly station 22 the bearing cap 7 is assembled again to the cylinder head 1 after having assembled various parts, including a camshaft 6, to the cylinder head 1. At the inspection station 23, a valve clearance inspection is performed. At each corner of the rectangular assembly line 20, there is disposed a turn table type of transition conveyer 25, 26, 28 or 30. Each turn table transition conveyer 25, 26, 28 or 30 is capable of turning 90 degrees in opposite directions so as to direct and transfer a cylinder head 1 from one transportation conveyer to another transportation conveyer. These transportation conveyers 24, 27, 29 and 31 and turn table transition conveyers 25, 26, 28 and 30 form a closed loop assembly line 20 so as to circulate cylinder heads 1 through the assembly line 20.

An incomplete cylinder head i(A) on a pallet P, to which is attached a bearing cap 7 which is assembled thereto, is transported and transferred onto the first turn table transition table 25 from a preceding station, i.e., a boring station (not shown), in this embodiment, in a direction shown by an arrow X1. The turn table transition conveyer 25 is not turned so as to pass the incomplete cylinder head 1(A) directly onto the first transportation conveyer 24 therethrough. At the disassembly station 21, the nut runner unfastens the nuts 10 from the bolts 9 of the incomplete cylinder head 1(A) for removal of the bearing cap 7. As will be described later, there are two different varieties of cylinder heads 1(A), 1(B) and 1(C) transported alternately, one after another, by the closed loop assembly line 20.

Before the assembly station 22, various parts, including a valve 2, a tappet 3 and a standard shim disk 4, are assembled to the incomplete cylinder head 1(A) and, thereafter, a camshaft 6 and the bearing cap 7, which has been removed from the incomplete cylinder head 1(A) at the disassembly station 21, are placed in position. At the assembly station 22, the nuts 10 are fastened onto the bolts 9 so as to secure the bearing cap 7, thereby provisionally assembling the cylinder head I(A). Thereafter, at the valve clearance inspection station 23, the provisional cylinder head 1(B) is inspected for valve clearance so as to determine an appropriate shim thickness.

After valve clearance inspection, the provisional cylinder head 1(B) on the pallet P is transported to and subsequently placed on the turn table transition conveyer 26. Then, the second turn table transition conveyer 26 turns 90 degrees so as to direct and transfer the provisional cylinder head 1(B) onto the transportation conveyer 27. In the same way, the provisional cylinder head 1(B) is transported to the first turn table transition conveyer 25 through the fourth turn table transition conveyer 30 and fourth transportation conveyer 31 via the third turn table transition conveyer 28 and third transportation conveyer 29.

In this instance, once the provisional cylinder head 1(B) has made a tour of the whole closed loop assembly line 20, the first turn table transition conveyer 25 is positioned so as to receive the provisional cylinder head 1(B) on the pallet P from the fourth transportation conveyer 31 and refuse the entry of an incomplete cylinder head 1(A) from the boring station. After the first turn table transition conveyer 25 has received the provisional cylinder head 1(B) from the fourth transportation conveyer 31, it turns 90 degrees so as to incorporate the provisional cylinder head in a row of cylinder heads 1 on the first transportation conveyer 24 and, simultaneously, pass an incomplete cylinder head 1(A) therethrough after the incorporated provisional cylinder head 1(B). Accordingly, there is a row of alternate incomplete cylinder heads 1(A) and provisional cylinder heads 1(B) on the first transportation conveyer 24.

The provisional cylinder head 1(B) is disassembled by unfastening the nuts 10 and removing the bearing cap 7 at the disassembly station 21. Before the assembly station 22, the camshaft 6 is displaced and the standard shim disk 4 is replaced with a shim disk having a thickness suitable for a desired valve clearance which has been determined at the inspection station 23 in the last circulation through the assembly line 20. After having placed the camshaft 6 and bearing cap 7 in position following the replacement of the standard shim disk 4 with another, the provisional cylinder head 1(B) is transported to the assembly station 22 where it is completely assembled as an enduring cylinder unit. The enduring cylinder head 1(C) is inspected again at the inspection station 23, or otherwise passed therethrough without being inspected. The second turn table transition conveyer 26 passes the enduring cylinder head 1(C) therethrough and transfers it in a direction shown by an arrow X5 toward a succeeding station (not shown). After every passage of an enduring cylinder head 1(C), the second turn table transition conveyer 25 receives a provisional cylinder head 1(B) after inspection and turns 90 degrees so as to direct it toward the second transportation conveyer 27. In a row of alternate incomplete, provisional and enduring cylinder heads 1(A) and 1(B) or 1(C), there is an empty pallet P after each loaded pallet P on the transportation conveyers 27, 29 and 31. These empty pallets P are loaded with incomplete cylinder heads 1(A) at the first turn table transition conveyer 25.

With the closed loop assembly line 20, in which the first turn table transition conveyer 25 incorporates provisional cylinder heads 1(B) and incomplete cylinder heads 1(A) alternately in a row so as to subject them to assemblage and disassemblage, the disassembly station 21 and the assembly station 22 are able to perform a first disassemblage and assemblage operations for incomplete cylinder heads 1(A) and another disassemblage and assemblage operation for provisional cylinder heads 1(B). These different species of cylinder heads 1(A) and 1(B), incorporated in a row on the transportation conveyer 24, are separately delivered by the second turn table transition conveyer 26. That is, the second turn table transition conveyer 26 removes the enduring cylinder heads 1(C) from the closed loop assembly line 20 and forces the provisional cylinder heads 1(B) into circulation through the closed loop assembly line 20.

Since, in general, the inspection of valve clearance takes a long time as compared with assemblage and disassemblage performed at the stations 21 and 22, if the inspection station 23 is located just after the assembly station 22 and before the second turn table transition conveyer 26 which removes enduring cylinder heads 1(C) from the closed loop assembly line 20, it causes detention of a cylinder head 1(A) or 1(B) between the assembly station 22 for a while. If there is such a detention, the assemblage and disassemblage at the stations 21 and 22 do not proceed with the arranged program, leading to a reduction in production efficiency.

In order to prevent any reduction in the production efficiency of the assembly line 20, an inspection station 23 may be located after a second turn table transition conveyer 26 which removes enduring cylinder heads 1(C) from the closed loop assembly line 20.

FIG. 3 illustrates a closed loop assembly line 20 in accordance with another preferred embodiment of the present invention. An inspection station 23' is located between a third and fourth turn table transition conveyers 28 and 30. With this closed loop assembly line 20, after a provisional cylinder head 1(B) has passed through the disassembly and assembly stations 21 and 22, it is completed as an enduring cylinder head 1(C) and removed from the assembly line 20 by the second turn table transition conveyer 26. Since there is a row of provisional cylinder heads 1(B) placed alternately on the pallets P on the third transportation conveyer 29 where the inspection station 23 is located, the inspection of valve clearance at the inspection station 23 does not interrupt the progress of disassemblage and assemblage at the disassembly station 21 and assembly station 22 even if it takes longer than the time spent performing the required operations at the preceding stations 21 and 22.

In the assembly line 20, the main transportation conveyer 24 may be driven separately from and at a speed lower than that of the transportation conveyers 27, 29 and 31. In this instance, even if a long time is spent at the inspection station 23 for the inspection of valve clearance, accumulation of provisional cylinder heads 1(B) before the inspection station 23 does not occur. This prevents the progress of disassemblage and assemblage at the disassembly station 21 and assembly station 22 from being interrupted and eliminates any harmful influence on the production efficiency of a production line.

As is apparent from the above description, an assembly line, according to the invention, permits both the disassembling station and the assembling station to be put to an optimum utilization twice, namely, a first time for provisional assemblage and a second time for complete assemblage. The production line, including the assembly line, can be built with the least necessary number of facilities and realize a rationalization of production and space and cost saving. The assembly line, in which the inspection station is installed along the circulation line, does not cause any accumulation of provisional units before the inspection station even if the inspection of valve clearance takes a long time. This provides an increase in production efficiency. Furthermore, because the entry of incomplete units and provisional units into the main assembly line alternates, it is easy to govern an assemblage operation even though there is a row of mixed works on the main assembly line.

Obviously, various other embodiments and variants may occur to those skilled in the art, which are within the scope and spirit of the invention. Such other embodiments and variants are intended to be covered by the following claims.

What is claimed is:

1. A method of assembling individual units in which an incomplete unit is moved forward along an assembly line in progression to successive disassembling and assembling stations for addition of component parts to the unit until the unit is complete, said method comprising the steps of:

disassembling, at the disassembling station, component parts from said incomplete unit, said component parts having been machined as an integral part of said incomplete unit;

adding and provisionally assembling, at the assembling station, components including a specific component part and the integrally machined component parts to said incomplete unit so as to provide a provisionally complete unit;

performing an inspection of a positional relationship of said component parts relative to one another;

disassembling, at said disassembling station, said component parts from said provisionally complete unit; and replacing said specific component part with another specific component part according to a result of said inspection and completely assembling said component parts again to the unit at said assembling station so as to provide an enduringly complete unit with a predetermined positional relationship among said component parts.

2. A method of assembling individual units as defined in claim 1, wherein said assembly line forms a closed loop so as to circulate and incorporate each provisionally complete unit into a row of incomplete units so that one provisionally complete unit is located after every incomplete unit before said disassembling station.

3. A method of assembling individual units as defined in claim 2, wherein said assembly line transfers said enduringly complete unit to a successive line after another said inspection.

4. A method of assembling individual units as defined in claim 2, wherein said assembly line transfers said enduringly complete unit to a successive line before another said inspection.

5. An apparatus for assembling units which moves an incomplete unit forward along an assembly line in progression to successive stations for addition of component parts to the unit until the unit is complete, said apparatus comprising:

a disassembling station, located in said assembly line, which receives each incomplete unit with component parts having been machined as an integral part of said incomplete unit and disassembles the integrally machined component parts from each said incomplete unit;

an assembling station, located in said assembly line after said disassembling station, which adds and assembles component parts including a specific provisional component part and said integrally machined component parts to said incomplete unit so as to provide a provisionally complete unit; and an inspection station, located in said assembly line after said assembling station, which inspects a positional relationship of said component parts relative to one another in said provisionally complete unit;

said assembly line forming a closed loop so as to circulate and incorporate said provisionally complete unit into a row of incomplete units so that one provisionally complete unit is located after every incomplete unit before said disassembling station in order to subject each provisionally complete unit to disassemblage of said component parts from said provisionally complete unit at said disassembling station and, after replacement of said specific provisional component part with another specific component part according to a result of said inspection, completing assemblage of said component parts again at said assembling station so as to provide a predetermined positional relationship among said component parts, thereby completing an enduringly complete unit.

6. An apparatus for assembling individual units as defined in claim 5, wherein said assembly line transfers said enduringly complete unit to a successive line after said inspection station.

7. A method of assembling individual units as defined in claim 5, wherein said assembly line transfers said enduringly complete unit to a successive line before said inspection station.

8. An apparatus for assembling units which moves incomplete units forward along an assembly line in progression to successive stations for addition of component parts to the unit until the unit is complete, said apparatus comprising:

a disassembling station, located in said assembly line, which receives each incomplete unit with component parts having been machined as an integral part of said incomplete unit and disassembles the integrally machined component parts from said incomplete unit;

an assembling station, located in said assembly line after said disassembling station, which adds and assembles component parts including a specific provisional component part and said integrally machined component parts to said incomplete unit so as to provide a provisionally complete unit; and an inspection station, located in said assembly line after said assembling station, which inspects a positional relationship of said component parts relative to one another;

said assembly line comprising a main assembly line, along which said disassembling station and said assembling station are arranged, and a circulation line, connected to said main assembly line so as to form a closed loop, which circulates and incorporates provisionally complete units into a row of incomplete units so that one provisionally complete unit is located after every incomplete unit so that each provisionally complete unit is subject to disassemblage of said component parts from said provisionally complete unit at said disassembling station and reassemblage of said component parts, including another specific component part, with which said specific provisional component part is replaced according to a result of said inspection, to the unit at said assembling station again so as to provide a predetermined positional relationship among said component parts, thereby completing on enduringly complete unit.

9. An apparatus for assembling units as defined in claim 8, wherein said inspection station is located along said main assembly line.

10. An apparatus for assembling units as defined in claim 8, wherein said inspection station is located along said circulation line.

11. An apparatus for assembling units as defined in claim 8, wherein said assembly line includes a turn table located at one end of said main assembly line before said disassembling station for alternate entry of said incomplete unit and said provisionally complete unit into said main assembly line and a turn table located at another end of said main assembly line after said assembling station for discharging said enduringly complete unit and transferring said provisionally complete unit onto said circulation line.

* * * * *